United States Patent [19]
Miller

[11] Patent Number: 5,979,492
[45] Date of Patent: Nov. 9, 1999

[54] FLUID LEVEL REGULATING SLEEVE VALVE

[76] Inventor: David P. Miller, P.O. Box 126, Libertyville, Iowa 52567-0126

[21] Appl. No.: 09/225,612

[22] Filed: Jan. 5, 1999

[51] Int. Cl.[6] ............................. F16K 11/085; F16K 11/02
[52] U.S. Cl. ................... 137/426; 137/625.47; 251/208; 251/209; 251/344; 251/345
[58] Field of Search ..................................... 137/426, 577, 137/625.41, 625.47; 251/205, 206, 207, 208, 343, 344, 345, 352

[56] References Cited

U.S. PATENT DOCUMENTS

| | | | |
|---|---|---|---|
| 306,169 | 10/1884 | Moseley | 251/352 |
| 699,621 | 5/1902 | Humphreys | 137/625.41 |
| 1,046,599 | 12/1912 | Jones . | |
| 1,139,104 | 5/1915 | Collar . | |
| 1,219,265 | 3/1917 | Denhard | 137/577 |
| 1,231,733 | 7/1917 | Haley et al. . | |
| 1,473,501 | 11/1923 | Munslow | 251/352 |
| 1,855,692 | 4/1932 | Roller . | |
| 2,755,652 | 7/1956 | Shelton et al. | 251/352 |
| 3,176,469 | 4/1965 | Fowler . | |
| 3,208,719 | 9/1965 | Hulsey | 251/207 |
| 3,662,710 | 5/1972 | Pankoke et al. | 137/577 |
| 3,874,413 | 4/1975 | Valdez | 137/625.47 |
| 5,340,030 | 8/1994 | Siegrist, Jr. . | |

*Primary Examiner*—George L. Walton
*Attorney, Agent, or Firm*—Schroeder & Siegfried P.A.

[57] ABSTRACT

A Sleeve Valve for regulating the water level in ponds, lagoons and other wetlands which includes an outer tubular section of plastic pipe with a plurality of vertically spaced openings and an inner tubular section of plastic pipe that is disposed telescopically within, and rotatable relative to, the outer tubular pipe. This inner tubular pipe includes a plurality of vertically spaced openings that are positionally staggered about a circumference and arranged for selective alignment with one of the openings in the outer pipe. Each of the openings in the outer pipe are sealed against the outer wall of the inner pipe until rotation of the inner pipe causes alignment of a selected opening in the outer pipe with a corresponding opening in the inner pipe, thereby allowing water to pass only through such corresponding aligned openings. The water level is regulated by selecting and aligning corresponding openings in the outer and inner pipes at the water level desired. Water passing through the aligned openings of the inner and outer pipes pass by gravitational flow to a remote location through a discharge conduit that is connected to the lower end of the outer pipe.

30 Claims, 5 Drawing Sheets

FLUID LEVEL REGULATING SLEEVE VALVE

BACKGROUND OF THE INVENTION

The present invention is related generally to the field of fluid or water level management. While a myriad of potential applications requiring fluid level regulation are conceivable, the present invention is particularly useful for the management of water level in ponds, wetland areas, irrigation fields, and the like.

What is certain in the present day is that there is an ever present and increasing demand for additional useable land. As the population grows, the need for increased crop production, transportation, housing, etc., has placed a burden upon industries to find better and more efficient ways to utilize land and water. Irrigation systems have become more sophisticated, requiring better control of water allocation and dispersion. Also, farming and construction industries alike are finding it necessary to move closer and closer to the outlying wetlands that were previously deemed unusable.

Ponds and wetlands can be unpredictable. The water level in a wetland area can increase or decrease dramatically, depending on the amount of snowfall or rainfall in a given year, or even in one day. Without the ability to regulate the water level in such areas, farmers crops, roadways, basements, etc., may be subject to flooding without control.

For the above reasons, there is a distinct and increasing need to regulate the water levels of ponds and surrounding wetlands. The present invention provides a unique and useful means for controlling and/or regulating the water levels of surrounding wetlands without destroying or disturbing the same, or the purpose for which they serve.

BRIEF SUMMARY OF THE INVENTION

The present invention is a water level regulating device which is comprised primarily of a pair of elongated upright tubular members disposed in telescoping relation to one another, wherein one tubular member is of slightly smaller diameter and seats telescopically within an outer tubular member, and is rotatable relative thereto. The outer tubular member is connected at its lower end, preferably in a sealed relation, to a fluid discharge conduit that drains any fluid entering the regulating device to a remote location.

Both the inner and outer tubular members include a plurality of openings in their wall structure, intermediate their upper and lower ends, to accommodate the flow of water therethrough. Preferably, the openings in the outer tubular member are vertically aligned and spaced between opposite ends thereof. The openings in the inner tubular member, by contrast, are preferably helically staggered in spaced relation about the circumference of its wall structure. Each opening in the inner tubular member is constructed and arranged for cooperative selective alignment with a corresponding opening in the wall structure of the outer tubular member.

As a result of the helical alignment of the openings in the inner tubular member, only one set of corresponding openings in the inner and outer tubular members will be cooperatively aligned at any given time. Because each of the openings in the outer tubular member carries a seal which bears against the wall structure of the inner tubular member, no fluid may pass through openings of the inner and outer tubular members unless the respective corresponding openings therein have been selected and cooperatively aligned to allow fluid passage therethrough. By selecting the appropriate openings for alignment, the water level of the wetland area within which the regulating device is installed may be effectively regulated and maintained at or below a desired level with little or no required maintenance.

While the above-described orientation of the respective openings in the inner and outer tubular members is preferred, it will be appreciated that other design orientations of such openings is conceivable and may be implemented without destroying the intended function of the invention herein.

For maintaining proper orientation of the inner tubular member relative to the outer tubular member, a plurality of alignment members are disposed between the inner and outer tubular member. Preferably, the alignment members are connected to the inner tubular member adjacent its opposite upper and lower ends, and lightly bear against the inner surface of the outer tubular member. This helps guide and maintain proper alignment of the inner tubular member within the outer tubular member. While the above construction is preferred, it will be appreciated that such alignment members could also connect to the outer tubular member, and bear lightly against the outer surface of the inner tubular member.

Additionally, connected to the upper end of the inner tubular member is at least one shoulder or stop member which bears against the upper end of the outer tubular member and acts as a vertical alignment device for the two tubular members. The shoulder member is connected to the inner tubular member at a predetermined location so as to cause cooperative vertical positioning and alignment between the corresponding openings in the inner and outer tubular members.

Through the use of my unique fluid level regulating device, the water level of ponds or wetlands surrounding farm and construction areas may be effectively regulated and maintained at or below a desired level with minimal effort. By simply rotating the inner tubular member relative to the outer tubular member, corresponding openings in the tubular members may be selected and aligned so as to allow passage of water therethrough only when the water level reaches a predetermined threshold level. As the water rises to the level of the pre-selected aligned openings in the inner and outer tubular members, the water will flow through the aligned openings, into the inner tubular member and out through the fluid discharge conduit to a remote location.

While the discussion herein is directed principally to the use of my invention to control water levels in ponds and wetlands, it will be appreciated that the invention described herein is equally beneficial for use in connection with indoor and/or outdoor plumbing systems, irrigation fields, as well as other fluid flow or fluid containment systems.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
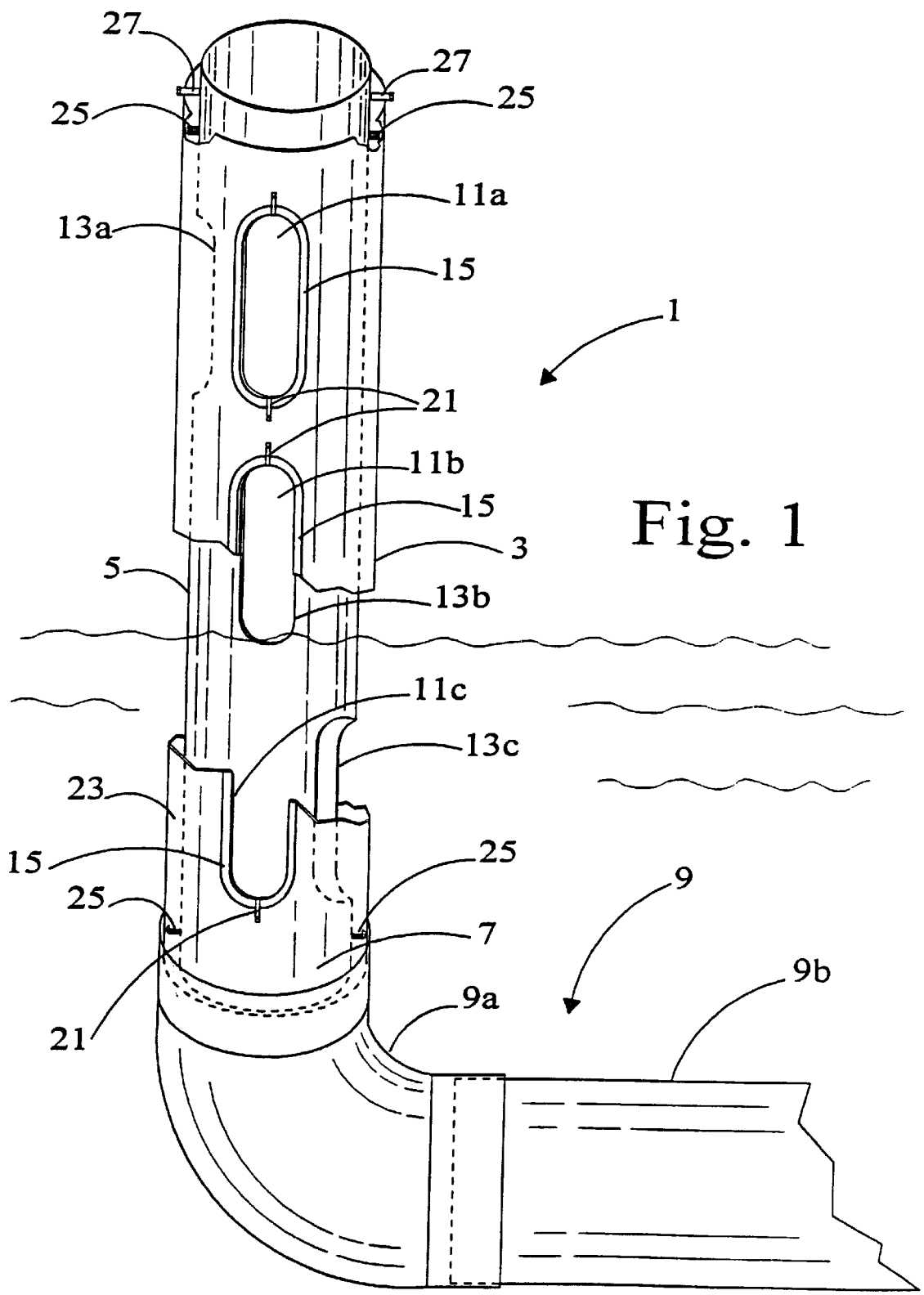
FIG. 1 is a perspective view of a fluid level regulating device which is the subject of my invention, showing the two telescoping tubular members arranged to allow passage of fluid through the centrally aligned openings therein, wherein the inner tubular member is substantially shown in phantom and portions of the outer tubular member have been broken away to show the relative orientation of the openings therein.

As shown in FIG. 1, the present invention is a fluid level regulating device 1 which may be used to maintain desired water levels in ponds, lagoons and wetlands, as well as other fluid flow and fluid containment systems. It is comprised of a tubular sleeve valve which includes a set of telescoping tubular members 3 and 5 that are preferably constructed of a rigid PVC, High Density Polyethylene or Polypropylene. The lower end portion or base 7 of the outer tubular member 3 is connected preferably in sealed relation to a fluid discharge conduit 9, which is constructed of like material and is formed from a connecting elbow 9a and discharge pipe 9b.

Each of the telescoping tubular members 3 and 5 include a plurality of vertically spaced openings therein which are constructed and arranged for selective cooperative alignment to allow the passage of water therethrough. As shown in FIGS. 1–4, inclusive, the outer tubular member 3 includes a plurality of openings 11a, 11b, and 11c, which extend through the intermediate wall portion of the tube between its opposite upper and lower ends. Openings 11a, 11b, and 11c are vertically spaced along the length of outer tubular member 3, and are substantially vertically aligned along an axis parallel to the longitudinal axis of such tubular member.

As is also shown in FIGS. 1–4, inclusive, inner tubular member 5 includes a plurality of openings 13a, 13b, and 13c, which extend through the intermediate portion of its wall structure extending between the opposite upper and lower end portions thereof. Similar to the openings in outer tubular member 3, the openings in tubular member 5 are vertically spaced between its upper and lower ends, and arranged in corresponding vertical orientation for selective alignment with similarly positioned openings in outer tubular member 3. More specifically, opening 13a in inner tubular member 5 is constructed and arranged for cooperative selective alignment with opening 11a in outer tubular member 3; opening 13b in inner tubular member 5 is arranged in corresponding relation for selective alignment with opening 11b in outer tubular member 3; and opening 13c in inner tubular member 5 is arranged for cooperative selective alignment with opening 11c in outer tubular member 3.

Unlike the openings in outer tubular member 3, however, openings 13a, 13b, and 13c in inner tubular member 5 are positionally staggered about its circumference preferably in a helical alignment. This helical arrangement of the openings in the inner tubular member 5 is perhaps shown best in the diagrammatical representation shown in FIG. 4, where it can be seen that each of the openings 13a, 13b, and 13c in inner tubular member 5 are angularly displaced from one another about its circumference so as to form a helical pattern.

Figure 2:
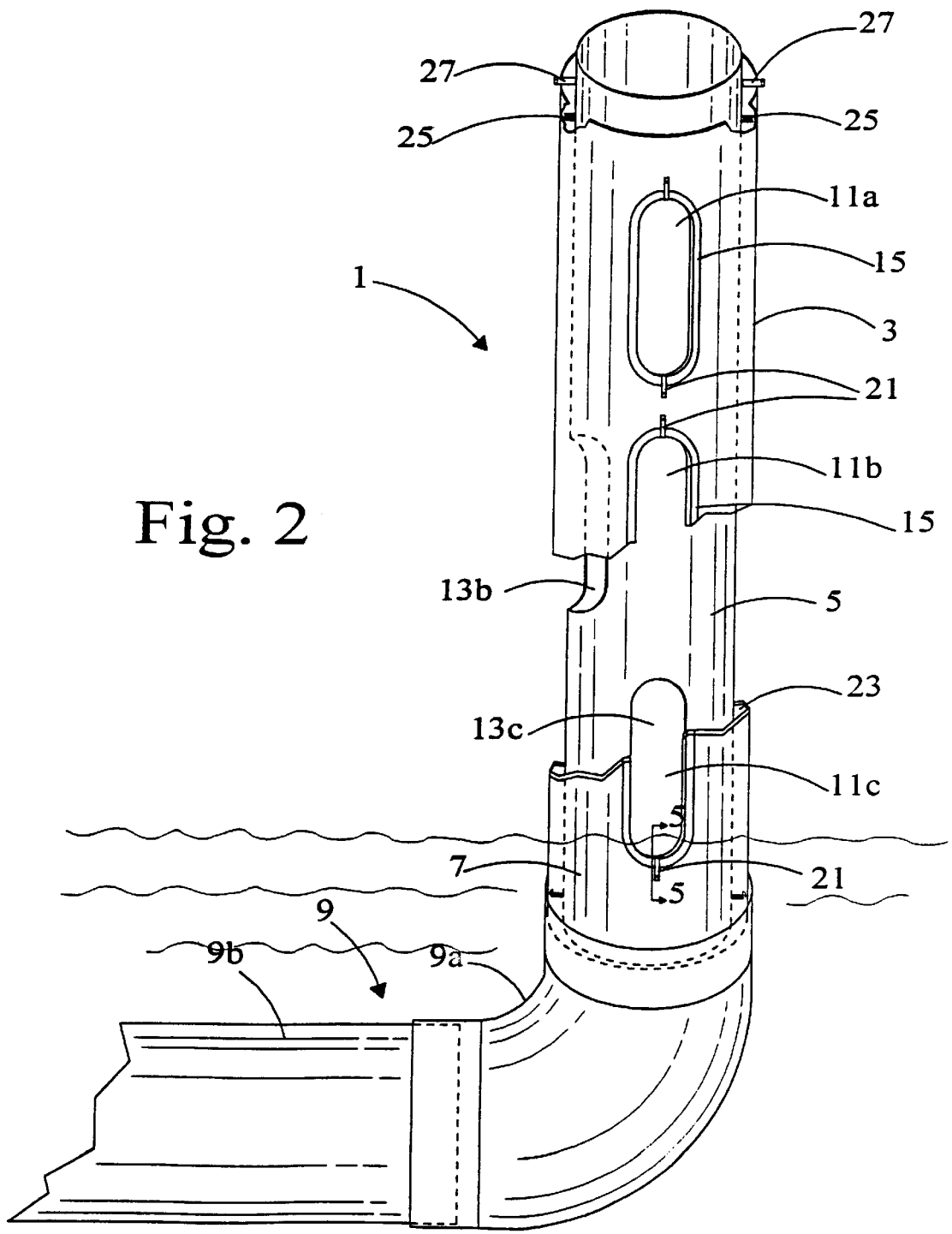
FIG. 2 is also a perspective view similar to that shown in FIG. 1, wherein the inner tubular member has been rotated and positioned for alignment of the lower openings in such tubular members.

As best shown in FIGS. 1 and 2, the helical arrangement of openings 13a, 13b, and 13c prevents more than one set of corresponding openings between inner tubular member 5 and outer tubular member 3 from being selectively aligned at any one time. In FIG. 1, it can be seen that inner tubular member 5 has been rotated within outer tubular member 3 so as to selectively align the central openings 13b and 11b, respectively. In FIG. 2, inner tubular member 5 has been rotated within outer tubular member 3 so as to provide selective cooperative alignment of lower openings 13c and 11c respectively.

Figure 5:
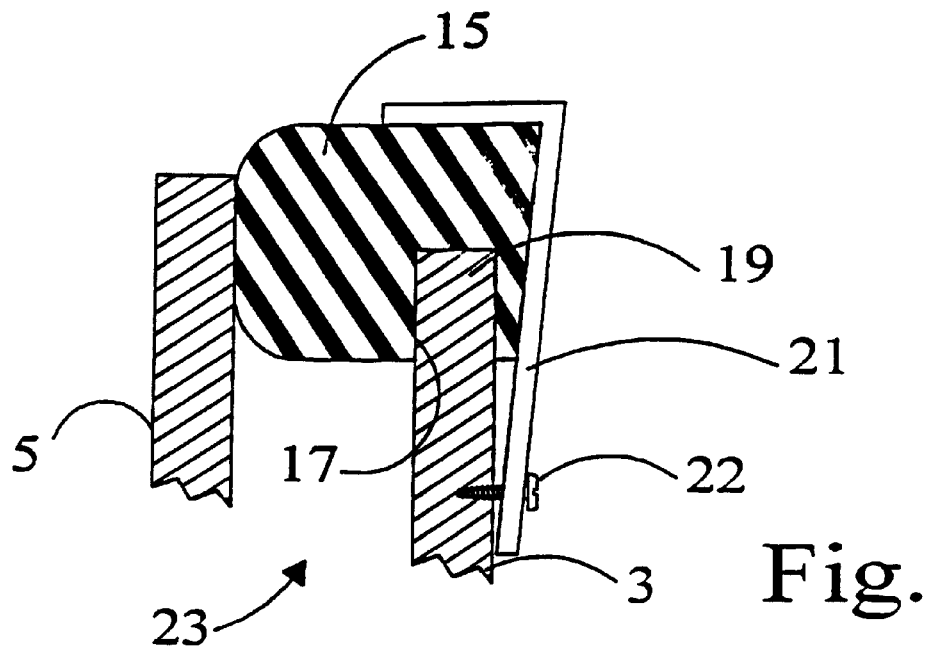
FIG. 5 is a sectional view taken along lines 5—5 of FIG. 2, and enlarged to show the sealing means disposed between the inner and outer tubular members adjacent the corresponding selected aligned openings therein.

Notably, each of the opening defining portions for openings 11a, 11b, and 11c in outer tubular member 3 carry a sealing member, preferably formed of an elastomeric material, which is designed to engage and seal against the outer surface of the wall structure of inner tubular member 5. As best shown in FIG. 5, sealing member 15 is constructed with a generally "U" shape cross-sectional configuration, which is defined by a groove 17 that is cut into its outer perimeter. As seen in FIG. 5, groove 17 is designed to receive and seat upon the opening defining portions 19 of each of the respective openings in outer tubular member 3. Preferably, a securing means, such as clamp 21, is utilized to secure the sealing member 15 in engaging position with the opening defining portions 19 of the respective openings in outer tubular member 3.

Clamp 21 may be formed of any suitable material for securing sealing member 15 in place, and may be secured to the outer tubular member 3 by means of a conventional screw 22 or other known connecting means. One or more of such clamps may be used, as needed, to secure the sealing member 15 in place. It will be appreciated that clamp 21 is only one preferred means of maintaining sealing member 15 in engaging relation to the opening defining portions 19 of the respective openings in outer tubular member 3. Other conceivable means of securing the sealing member 15 in place on such opening defining portions 19 are readily known and available, and could be used to accomplish the same function.

As can be seen from FIGS. 1, 2 and 5, sealing member 15 engages and presses against the outer surface of inner tubular member 5 so as to seal thereagainst and prevent any flow of fluid between the outer and inner tubular members. Thus, as shown in FIG. 1, as the water level in a pond or the like rises to the level of opening 11c in outer tubular member 3, the water is prevented from flowing through space 23 between the outer and inner tubular members by sealing member 15, which seals against the outer surface of inner tubular member 5. Water may not flow through sleeve valve 1 until the water level reaches the selected aligned openings 13b and 11b in the respective tubular members. Upon reaching such level, the sealing member 15 prevents water from flowing through space 23 between the inner and outer tubular members adjacent openings 11b and 13b, and causes the water to flow through the openings and into the interior of inner tubular member 5. As a result of gravitational flow, the water level then travels down through inner tubular member 5 and out to a remote location through fluid discharge conduit 9.

In a similar manner, the water level shown in FIG. 2 is regulated at a lower level, which is determined by selective alignment of openings 11c and 13c in the inner and outer tubular members 5 and 3, respectively. Again, the sealing member 15 surrounds the opening defining portions of opening 11c in outer tubular member 3, and prohibits water from flowing through the space 23 between the inner and outer tubular members. The water is instead directed through the aligned openings 11c and 13c and into the interior of inner tubular member 3, where it then flows through the fluid discharge conduit 9 to a remote location.

By simply rotating the inner tubular member 5 further relative to the outer tubular member 3, the water level of a wetland can be adjusted to a level corresponding to openings 11a and 13a in the respective tubular members. While sealing member 15 is shown preferably as an elastomeric seal or gasket which lines the defining portions 19 of openings 11a, 11b, and 11c in outer tubular member 3, it will be appreciated that other designs and constructions of sealing members are readily conceivable which would perform the same function of limiting water flow only through the selected aligned openings of the respective tubular members, so as to effectively regulate and maintain the level of the water at the depth desired.

Figure 3:
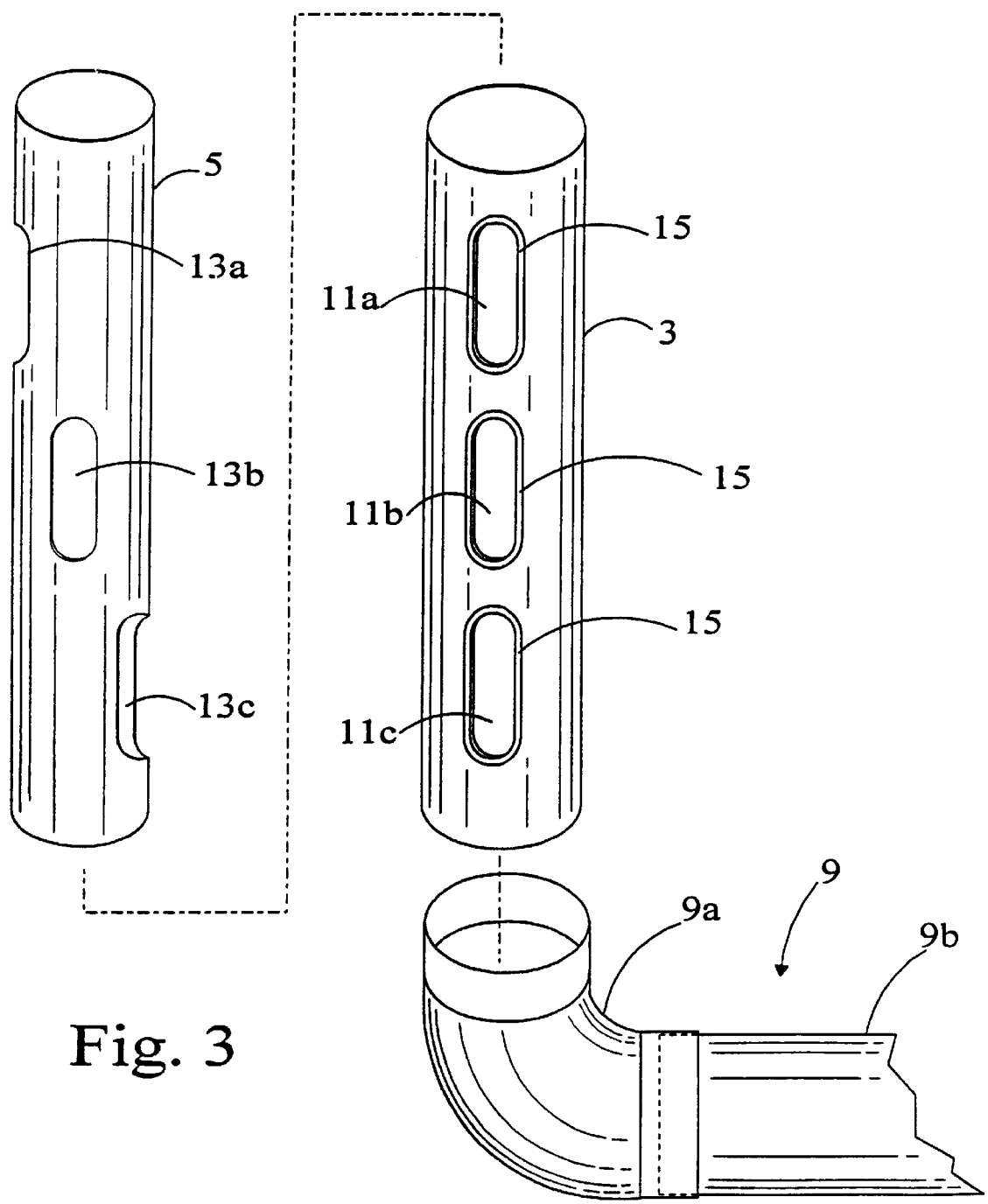
FIG. 3 is an exploded view of the fluid level regulating device which is the subject of my invention, showing the basic tubular components thereof and the manner in which they interengage.
Figure 4:
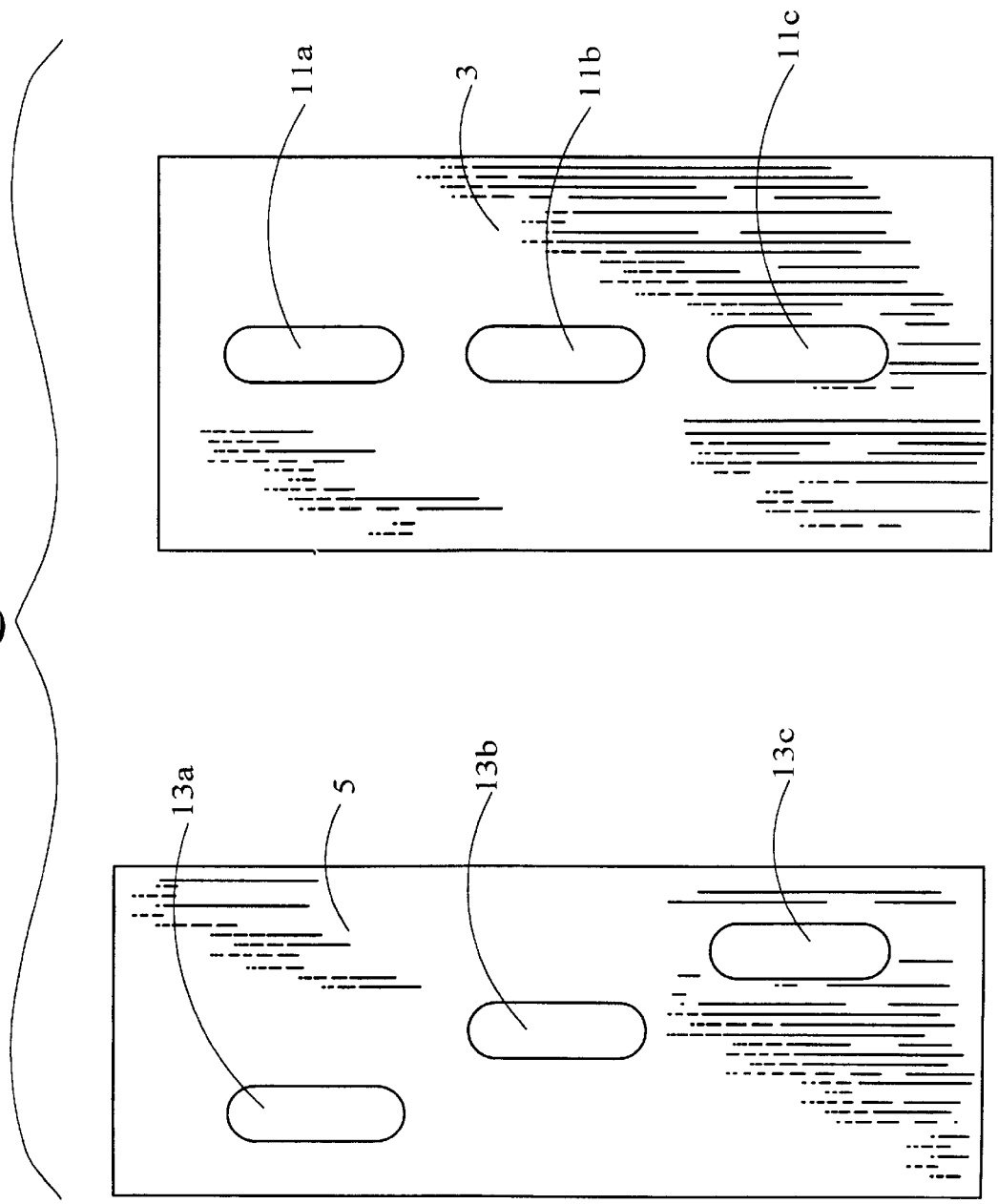
FIG. 4 is a diagrammatic representation of the inner and outer tubular members as if the same were vertically cut and flattened out so as to show the relative preferred orientation of the openings in each.

As shown best in FIG. 3, my water regulating sleeve valve 1 is constructed by securing outer tubular member 3 with vertically aligned openings 11a, 11b, and 11c within elbow 9a of fluid discharge conduit 9. With outer tubular member 3 connected in sealed relation to fluid discharge conduit 9, inner tubular member 5, having helically staggered openings 13a, 13b, and 13c is inserted within outer tubular member 3. As best shown in FIGS. 1 and 2, inner tubular member 3 is maintained in substantially coaxial relation with outer tubular member 3 by axial alignment members 25.

Figure 6:
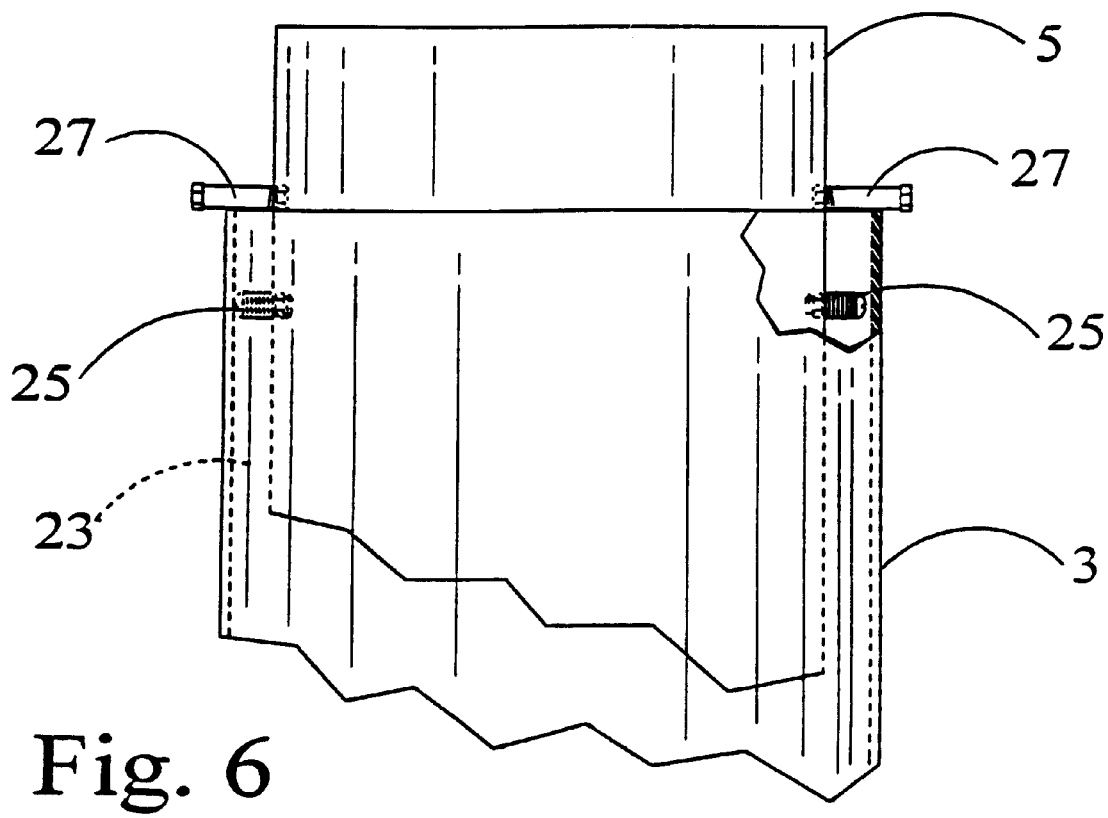
FIG. 6 is an enlarged side elevational view of the top portion of the fluid level regulating device which is the subject of my invention, with a portion of the outer tubular member broken away so as to show the shoulder and alignment members for maintaining proper orientation of the inner tubular member relative to the outer tubular member.

As shown best in FIG. 6, each axial alignment member 25 is preferably constructed of a screw or lug which is secured to the wall structure of inner tubular member 5, from which it extends radially outward to a point adjacent the wall structure of the outer tubular member 3. The alignment members 25 may be slightly spaced from or lightly engage the inner surface of outer tubular member 3, but must allow for free rotational movement of inner tubular member 5 within the confines of outer tubular member 3.

As is further shown in FIGS. 1, 2, and 6, inner tubular member 5 includes a shoulder or stop means 27 connected adjacent its upper end. Shoulder 27 extends radially outward from tubular member 5 to a point where it will engage the upper end of outer tubular member 3 when telescopically inserted therein. As shown best in FIG. 6, the shoulder or stop means 27 is preferably constructed of a plurality of screws or lugs which are fixedly connected to the upper end of inner tubular member 5, and extend radially outward therefrom. The shoulders 27 effectively increase the diameter of inner tubular member 5 at its upper end beyond the interior diameter of outer tubular member 3. As such, inner tubular member 5 may not be inserted into outer tubular member 3 beyond the point of such shoulders 27.

Notably, shoulder members 27 also serve an aligning purpose by maintaining the vertical alignment of the openings 13a, 13b, and 13c in inner tubular member 5 with the corresponding openings 11a, 11b, and 11c in outer tubular member 3. Although the shoulder or stop members 27 are shown preferably as a plurality of lugs extending outwardly from inner tubular member 5, it will be appreciated that there are other conceivable configurations which would also serve the purpose of providing a shoulder at the upper end of inner tubular member 5. By way example, one such conceivable configuration may be the integral formation of one or more radially extending shoulder portions which would effectively increase the diameter of the upper end portion of inner tubular member 5.

From the above, it is apparent that through the use of my unique fluid level regulating sleeve valve, effective control of the water level in surrounding wetlands can be maintained in a cost efficient and effective manner, with minimal effort. By installing my fluid level regulating sleeve valve, the water level may be adjusted to a desired level by simply selecting and aligning the proper corresponding openings between the outer tubular member 3 and inner tubular member 5 thereof. No further maintenance of the system is required unless a subsequent change in the water level within the wetland is desired or required. Through the use of my invention, farmers and construction contractors alike may move closer to the surrounding wetlands without the threat of uncontrolled flooding, and with confidence that they may continue to conduct their businesses without undesirable consequences therefrom.

It will, of course, be understood that various changes may be made in the form, details, arrangement and proportions of the parts without departing from the scope of the invention which comprises the matter shown and described herein and set forth in the appended claims.

I claim:

1. A fluid level regulating device, comprising:
   a) an inner tubular member having opposite end portions and an intermediate wall structure therebetween;
   b) an outer tubular member having opposite end portions and an intermediate wall structure therebetween, said outer tubular member being disposed in telescoping relation to said inner tubular member;
   c) said inner tubular member having opening-defining portions in its said wall structure which define a plurality of spaced openings;
   d) said outer tubular member having opening-defining portions in its said wall structure which define a plurality of spaced openings;
   e) at least one of said tubular members being movable relative to said other tubular member;
   f) each of said openings in each of said tubular members being positionally arranged for selective communicating alignment with one of said openings in said other tubular member;
   g) sealing means being disposed between said inner and outer tubular members for allowing fluid to pass only through said openings in said inner and outer tubular members that are selected to be cooperatively aligned in communicating relation; and
   h) at least one of said tubular members being connectable to a fluid discharge member for causing removal of fluid passing through said openings in said inner and outer tubular members that are selected to be cooperatively aligned in communicating relation;
   i) said openings of said tubular members being positioned relative to each other such that alienable openings of said members are alignable at any time at only a single level.

2. The structure defined in claim 1, wherein at least one of said tubular members is movable relative to an axis extending between said opposite end portions of said other tubular member.

3. The structure defined in claim 1, wherein at least one of said tubular members is rotationally movable relative to an axis extending between said opposite end portions of said other tubular member.

4. The structure defined in claim 1, wherein said inner tubular member is rotationally movable within said outer tubular member relative to an axis extending between said opposite end portions of said outer tubular member.

5. The structure defined in claim 1, wherein said openings in one of said tubular members are positionally staggered relative to said openings in said other tubular member.

6. The structure defined in claim 1, wherein said openings in at least one of said tubular members are positionally staggered about the circumference of its said wall structure.

7. The structure defined in claim 1, wherein said openings in at least one of said tubular members are helically staggered about the circumference of its said wall structure.

8. The structure defined in claim 1, wherein said openings in one of said tubular members are positionally staggered about the circumference of its said wall structure, and said openings in said wall structure of said other tubular member are aligned parallel to an axis extending between said opposite end portions thereof.

9. The structure defined in claim 1, wherein said openings in said inner tubular member are positionally staggered about the circumference of its said wall structure, and said openings in said outer tubular member are positionally spaced in its said wall structure along a line parallel to an axis extending between said opposite end portions thereof.

10. The structure defined in claim 9, wherein said openings in said inner tubular member are helically staggered about the circumference of its said wall structure.

11. The structure defined in claim 1, wherein said sealing means is comprised of a gasket seated adjacent said opening-defining portions of each of said openings of said outer tubular member.

12. The structure defined in claim 1, wherein said sealing means is comprised of a plurality of gaskets, one each being seated on said opening-defining portions of one of said openings in said wall structure of said outer tubular member.

13. The structure defined in claim 12, wherein each of said gaskets is comprised of a generally U-shaped elastomeric member which straddles and engages said opening-defining portions of one of said openings in said wall structure of said outer tubular member.

14. The structure defined in claim 12, wherein each of said gaskets includes a groove within which is seated said opening-defining portions of one of said openings in said wall structure of said outer wall.

15. The structure defined in claim 1, including alignment means for maintaining axial and radial alignment of said inner tubular member relative to said outer tubular member.

16. The structure defined in claim 15, wherein said alignment means includes at least one guide member which engages said inner and outer tubular members, and extends therebetween to maintain the relative radial orientation of said inner tubular member to said outer tubular member.

17. The structure defined in claim 15, wherein said alignment means includes a shoulder member connected to said inner tubular member and extending radially outward therefrom, said shoulder member being constructed and arranged to engage said outer tubular member and maintain the relative axial orientation of said inner tubular member to said outer tubular member.

18. The structure defined in claim 1, including at least one radial alignment member disposed between and engaging said inner and outer tubular members for maintaining the relative radial orientation of said inner tubular member to said outer tubular member.

19. The structure defined in claim 1, including at least one axial alignment member disposed between and engaging said inner and outer tubular members for maintaining the relative axial orientation of said inner tubular member to said outer tubular member.

20. A fluid level regulating device comprising;
   a) an inner tubular member having opposite end portions and an intermediate wall structure therebetween;
   b) an outer tubular member having opposite end portions and an intermediate wall structure therebetween, said outer tubular member being disposed in telescoping relation to said inner tubular member;
   c) said inner tubular member having opening-defining portions in its said wall structure which define a plurality of spaced openings;
   d) said outer tubular member having opening-defining portions in its said wall structure which define a plurality of spaced openings;
   e) at least one of said tubular members being rotatably moveable relative to an axis extending between said opposite end portions of said other tubular member;
   f) said openings in at least one of said tubular members being positionally staggered about the circumference of its said wall structure, and each of said openings in each of said tubular members being positionally arranged for selective communicating alignment with one of said openings of said other tubular member;
   g) each of said opening-defining portions in said wall structure of said outer tubular member carrying a sealing member that is constructed and arranged to seal against said wall structure of said inner tubular member and prevent passage of fluid therethrough until said opening which carries said sealing member is selectively aligned with one of said openings of said inner tubular member; and
   h) at least one of said tubular members being connectable to a fluid discharge member for causing removal of fluid passing through said openings in said inner and outer tubular members that are selected to be cooperatively aligned in communicating relation;
   i) said openings of said tubular members being positioned relative to each other such that alienable openings of said members may be cooperatively aligned at only a single level at any one time.

21. The structure defined in claim 20, wherein said inner and outer tubular members are circular in cross section and said inner tubular member is substantially coaxial with said outer tubular member, said inner tubular member being rotatably movable within the confines of said outer tubular member.

22. The structure defined in claim 20, wherein said openings in said inner tubular member are staggered helically about the circumference of its said wall structure.

23. The structure defined in claim 20, wherein said openings in at least one of said tubular members are spaced helically about the circumference of its said wall structure.

24. The structure defined in claim 20, wherein each of said sealing members is comprised of a generally U-shaped elastomeric member which straddles and engages said opening-defining portions upon which it is carried.

25. The structure defined in claim 20, including alignment means for maintaining axial and radial alignment of said inner tubular member relative to said outer tubular member.

26. The structure defined in claim 20, including at least one radial alignment member disposed between and engaging said inner and outer tubular members for maintaining the relative radial orientation of said inner tubular member to said outer tubular member.

27. The structure defined in claim 20, including at least one axial alignment member disposed between and engaging said inner and outer tubular members for maintaining the relative axial orientation of said inner tubular member to said outer tubular member.

28. A fluid level regulating device, comprising;
  a) an elongated inner tubular member having opposite end portions and an intermediate wall structure of circular cross section therebetween;
  b) an elongated outer tubular member having opposite end portions and an intermediate wall structure of circular cross section therebetween, said outer tubular member telescoping over said inner tubular member in substantially coaxial relation thereto;
  c) said inner tubular member having opening-defining portions in its said wall structure which define a plurality of openings that are helically spaced about the circumference of its said wall structure;
  d) said outer tubular member having opening-defining portions in its said wall structure which define a plurality of spaced openings positioned along a line substantially parallel with the longitudinal axis of said outer tubular member;
  e) said inner tubular member being rotatably moveable about its longitudinal axis within the confines of said outer tubular member;
  f) each of said openings in each of said tubular members being positionally arranged for selective communicating alignment with one of said openings in said other tubular member;
  g) sealing means being disposed between said inner and outer tubular members for allowing fluid to pass only through said openings in said inner and outer tubular members that are selected to be cooperatively aligned in communicating relation;
  h) alignment means for maintaining axial and radial alignment of said inner tubular member relative to said outer tubular member; and
  i) said outer tubular member being connected to a fluid discharge member for causing removal of fluid passing through said openings in said inner and outer tubular members that are selected to be cooperatively aligned in communicating relation;
  j) said openings of said tubular members being positioned to enable only one opening of each of said members to be cooperatively aligned with a corresponding opening in the other of said members at a given time.

29. The structure defined in claim 28, wherein said sealing means is comprised of a plurality of elastomeric gaskets, one each of which is carried by said opening-defining portions of one of said openings in said wall structure of said outer tubular member.

30. The structure defined in claim 28, wherein said alignment means includes at least one guide member extending between and engaging said inner and outer tubular members to maintain the relative radial orientation of said inner tubular member to said outer tubular member, and a stop member extending between and engaging said inner and outer tubular members to maintain the relative axial orientation of said inner tubular member to said outer tubular member.

\* \* \* \* \*